O. A. KENYON.
WELDING TOOL.
APPLICATION FILED JULY 26, 1918.

1,287,337.

Patented Dec. 10, 1918.

Inventor:
Otis A. Kenyon.
By J. Walter Fowler
Atty.

UNITED STATES PATENT OFFICE.

OTIS ALLEN KENYON, OF NEW YORK, N. Y.

WELDING-TOOL.

1,287,337.  Specification of Letters Patent.  Patented Dec. 10, 1918.

Application filed July 26, 1918. Serial No. 246,800.

*To all whom it may concern:*

Be it known that I, OTIS A. KENYON, a citizen of the United States, residing at New York, in the county of New York and State of New York, have invented certain new and useful Improvements in Welding-Tools, of which the following is a specification.

My invention relates to certain new and useful improvements in implements or tools designed as holders for the electrode in arc welding, and the invention consists of the parts and the constructions, arrangements and combinations which I shall hereinafter describe and point out in the claims.

In the accompanying drawing forming part of this specification and in which similar reference letters indicate like parts in the several views.

Figure 1:
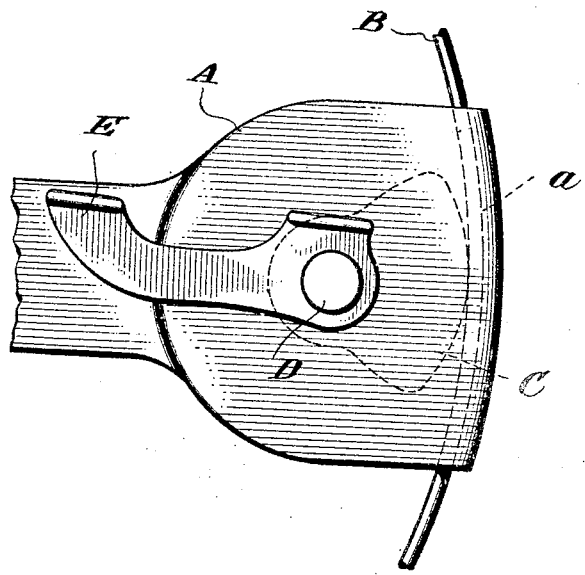
Figure 1 is an embodiment of my invention showing a plan view of a holder gripping an electrode.
Figure 2:
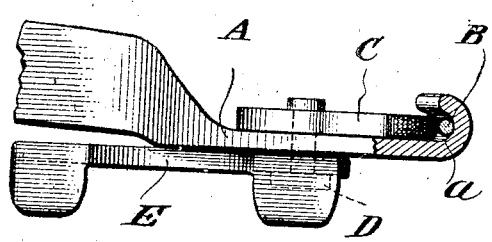
Fig. 2 is a side elevation of the same.

In order that my invention may be fully appreciated, reference is made to the prior art as follows:

One of the elements most important to the successful application of arc welding is the electrode holder or welding tool. Many types of tools have been used in practice, and practically all are based on one or the other of the following principles:

First, a pair of jaws that are sprung apart by the insertion of the electrode. If the spring of the jaws is strong enough to make good contact, and last for any length of time, it is usually too strong to permit the insertion of the welding pencil or electrode without prying apart the jaws.

The second class of holders depends upon the action of a compression spring to hold the welding pencil or electrode; the spring being compressed to allow the insertion of the electrode and then released. The disadvantage of this type is that the spring must be strong enough to prevent the pulling loose of the pencil when it freezes to the work; otherwise an arc will be drawn between the tool and the pencil, and thus destroy the tool.

Another type of electrode holder that has been in use is a combination of a spring and a pair of jaws, operated by a thumb lever. The main disadvantage of this holder is that when the pencil freezes to the work, the operator instinctively releases it at the holder, which in a short time causes its destruction.

To overcome all these disadvantages, I have devised a holder which is free from all springs, which gives ample surface for transmission of current to the welding pencil without over-heating, and which provides a grip that automatically tightens when the operator attempts to pull it loose from the work.

This novel form of tool which I shall now describe, renders the operation of changing electrodes or welding pencils, one of definite duration, and eliminates over-heating and destruction due to arcs. These advantages the arc-welding art will readily appreciate.

The implement or tool shown consists of a suitable body portion A in the form of a casting, preferably of brass, or a similar alloy of good electric conductivity. To one end of the body of this tool is designed to be attached the usual welding cable lead; at the other end of the body, A, provision is made for clamping the electrode, B. A simple method of effecting the desired clamping of the electrode is to employ a cam, or segment, C, rotatably mounted upon a pin D carried by the aforesaid body, said cam or segment having, if desired, a roughened face for more positively gripping the electrode between itself and the body A, said body being shown as having an upturned edge forming a groove or channel *a* for the reception of the electrode. The gripping face of the cam may be substantially spiral or the part C may be eccentrically mounted to exert the desired gripping action, the arrangement in any event being such that when the cam or segment is rotated in one direction the gradually decreasing curvature of its gripping face will release the electrode because of the increased gap created between said face and the grooved end of the body A; when the cam or segment is rotated in the opposite direction, the aforesaid gap is constricted or decreased and the gradually increasing curvature of the face of the cam firmly grips the electrode in place on or in the body A.

The rotation of the cam may be effected by any well known agency depending somewhat on the size of the tool or implement;

for instance in a hand-tool, a lever E on the pin, D, may be employed, or if preferred, any well known fixture mounted near the welding station may be used, but when such a fixture is adopted as the means for operating the aforesaid cam, the operation of inserting the welding pencil will be accomplished by thrusting the end of the tool into the fixture, pulling the handle up, while the fixture holds the lever stationary, inserting the pencil, pushing down the handle and, finally withdrawing the tool.

From the foregoing it will be understood that I have devised a tool, devoid of springs which overcomes the objections common to other tools for holding the electrodes in arc-welding operations, and that the improved tool gives ample surface for the proper transmission of the electric current to the welding pencil without over-heating, and which produces a positive and effective grip that is automatically increased whenever the operator attempts to pull the electrode holder loose from the work.

Having thus described my invention what I claim as new and desire to secure by Letters Patent is:

1. In electric welding, a welding pencil or other electrode holder provided with means for tightening the hold on the electrode when a downward pull occurs thereon.

2. In electric welding, an electrode and a holder therefor, said holder provided with a clamp adapted to wedge the electrode in place.

3. In electric welding, an electrode and a welding tool provided with a cam adapted to hold said electrode in place.

4. In electric welding, an electrode and a welding tool provided with a cam adapted to hold said electrode in place and to tighten the hold thereon when a downward pull on the electrode occurs.

5. In electric welding, an electrode and a holder therefor, said holder being electrically connected to the welding cable lead, and provided with an electric conducting surface against which said electrode is held, and a clamp adapted to wedge the electrode against said surface.

6. In electric welding, an electrode and a holder therefor, said holder being provided with a rotary cam adapted to decrease the size of the electrode-holding-space when rotated in one direction, and to increase the size of the same when rotated in the opposite direction.

7. In electric welding, an electrode and a holder therefor, said holder being electrically connected to the welding cable lead and provided with a recess in which the electrode is placed, a rotary cam adapted to wedge the electrode in place, and a lever to operate said cam.

In testimony whereof I affix my signature.

OTIS ALLEN KENYON.